United States Patent
Clatty et al.

(10) Patent No.: US 8,552,079 B2
(45) Date of Patent: Oct. 8, 2013

(54) WATER-BLOWN, FLAME RETARDANT RIGID POLYURETHANE FOAM

(75) Inventors: Jan L. Clatty, Moon Township, PA (US); Donald L. McCalmon, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 2242 days.

(21) Appl. No.: 11/292,193

(22) Filed: Dec. 1, 2005

(65) Prior Publication Data

US 2007/0129452 A1    Jun. 7, 2007

(51) Int. Cl.
*C08G 18/00* (2006.01)

(52) U.S. Cl.
USPC .............. 521/170; 155/172; 155/174

(58) Field of Classification Search
USPC ................. 521/170, 172, 174, 155
See application file for complete search history.

(56) References Cited

U.S. PATENT DOCUMENTS

| | | | |
|---|---|---|---|
| 4,407,981 A | 10/1983 | Aaronson | 521/107 |
| 4,685,402 A * | 8/1987 | Nelson et al. | 109/65 |
| 4,690,954 A | 9/1987 | Wampfler et al. | 521/107 |
| 4,797,428 A | 1/1989 | Reichmann | 521/137 |
| 4,940,632 A | 7/1990 | Nicola et al. | 428/318.4 |
| 6,066,681 A | 5/2000 | Kaplan et al. | 521/125 |
| 6,319,962 B1 | 11/2001 | Singh et al. | 521/170 |
| 6,808,800 B2 * | 10/2004 | Tomasi | 428/314.4 |
| 2004/0162359 A1 * | 8/2004 | Barber et al. | 521/159 |
| 2004/0198856 A1 | 10/2004 | Ingold et al. | 521/156 |
| 2005/0148677 A1 * | 7/2005 | Elsken et al. | 521/155 |
| 2006/0084708 A1 * | 4/2006 | Schilling et al. | 521/128 |

FOREIGN PATENT DOCUMENTS

EP    1 167 414 A1    1/2002

* cited by examiner

*Primary Examiner* — Melissa Rioja

(74) *Attorney, Agent, or Firm* — Lyndanne M. Whalen; John E. Mrozinski, Jr.

(57) ABSTRACT

The present invention provides a flame-retardant polyurethane foam made with non chlorofluorocarbon/hydrogenated chlorofluorocarbon-containing blowing agents and without trimethylolpropane-based polyols that achieves a Class I rating as determined by a modification of the ASTM E-84 tunnel test and may find application in electronic cabinetry, architectural decorative moldings, and interior transportation vehicle walls.

37 Claims, No Drawings

WATER-BLOWN, FLAME RETARDANT RIGID POLYURETHANE FOAM

FIELD OF THE INVENTION

The present invention relates in general to polyurethane foams, and more specifically, to water-blown rigid polyurethane foams which are flame retardant and which satisfy the requirements of ASTM E-84 for Class I materials.

BACKGROUND OF THE INVENTION

Polyurethane foams are used for a wide variety of applications, such as thermal insulation, packaging, upholstery, carpet underlay, automobile dashboards and structural material. An important factor to be considered in employing polyurethane or other polymeric foams is the ability of such foams to resist ignition, or once ignited, to be self-extinguishing after the ignition source is removed. This factor becomes even more important if the foam is to be used within a confined space.

As those skilled in the art are aware, the most common method of decreasing the flammability of polyurethane foams is by incorporating a flame retarding agent, such as a halogen- or phosphorus-containing compound, into the foam formulation. Although such compounds provide some improvement in the flame retardation properties, relatively large quantities of these agents may have to be employed to obtain satisfactory results.

For many years, the dominant blowing agents used to expand polyurethane foam had been the cholorfluorocarbons. These blowing agents were phased out after having been determined to pose a threat to stratospheric ozone. After the cholorfluorocarbons were phased out, the most common class of blowing agents became the hydrogenated chlorofluorocarbons. Although these are considered to be somewhat more environmentally friendly expansion agents, the hydrogenated chlorofluorocarbons still contain some chlorine. The chlorine atoms of hydrogenated chlorofluorocarbons are stable at altitudes under the stratosphere, and thus have a lower ozone-depleting potential ("ODP"). However, because of the hydrogenated chlorofluorocarbons still have a small ODP, they have also been mandated for eventual phase out. Water and/or carbon dioxide are rapidly becoming the blowing agents of choice for polyurethane foam manufacturers.

As known to those skilled in the art, polyurethane foams can be made using trimethylolpropane-based polyols (See e.g., U.S. Pat. Nos. 6,319,962, 4,690,954 and 4,407,981). Although there are some polyurethane foams available that pass the ASTM E-84 Tunnel Test "Standard Test Method for Surface Burning Characteristics of Building Materials" (ASTM International) with a Class I rating (U.S. Pat. Nos. 4,797,428 and 4,940,632), these foams use the alternative chlorofluorocarbon/hydrogenated chlorofluorocarbon blowing agents in combination with highly loaded polyester polyol blends and liquid flame retardants or have high flame retardant filler loadings, including phosphorus-based materials, in combination with trimethylolpropane-based polyols to produce the desired end result. These polyester-containing foams tend to reduce long term hydrolytic and "creep" stability and thus become a problem for applications outside of insulation-type foams.

Therefore, despite the abundance of disclosed processes to obtain flame retardant foams, polyurethane foam manufacturers remain interested in a foam that is solely water-, or carbon dioxide-blown; that satisfies the tunnel test of ASTM E-84 with a Class I rating; and that is free from trimethylolpropane-based polyols with phosphorus-based flame retardants.

Development of such a flame retardant polyurethane foam would therefore be very desirable. Furthermore, because of environmental concerns, it would be further desirable that such a foam use non chlorofluorocarbon/hydrogenated chlorofluorocarbon-containing blowing agents, such as water and/or carbon dioxide.

SUMMARY OF THE INVENTION

Accordingly, the present invention provides such a flame retardant, rigid polyurethane foam. The inventive foam remains intact during burning with no extra aids and is able to achieve a comparable Class I rating for the ASTM E-84 Tunnel Test. The inventive foam employs only water or carbon dioxide initiating compounds for foam blowing and can be used in any application requiring some integral skin formation and strength, and ranging in molded density from about 15 to about 61.5 pounds/cubic foot. This inventive foam-forming formulation includes at least one sucrose-based polyol, at least one non sucrose-based isocyanate-reactive compound and at least one aromatic polyester polyol but excludes trimethylolpropane-based polyols in combination with phosphorous-containing flame retardants.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, hydroxyl (OH) numbers, functionalities and so forth in the specification are to be understood as being modified in all instances by the term "about." Equivalent weights and molecular weights given herein in Daltons ("Da") are number average-equivalent weights and number average molecular weights respectively, unless indicated otherwise.

The present invention provides a rigid polyurethane foam made from the reaction product of at least one polyisocyanate with a polyol component containing from 2 wt. % to 35 wt. %, based on the weight of the polyol component, of at least one sucrose-based polyol, from 2 wt. % to 35 wt. %, based on the weight of the polyol component, of at least one non sucrose-based isocyanate-reactive compound, and from 1 wt. % to 13 wt. %, based on the weight of the foam, of at least one aromatic polyester polyol, in the presence of water, and optionally, at least one of carbon dioxide, surfactants, flame retardants, pigments, catalysts and fillers, with the proviso that the rigid polyurethane foam contains no trimethylolpropane-based polyols.

The present invention further provides a process for making a rigid polyurethane foam involving reacting at least one polyisocyanate with a polyol component containing from 2 wt. % to 35 wt. %, based on the weight of the polyol component, of at least one sucrose-based polyol, from 2 wt. % to 35 wt. %, based on the weight of the polyol component, of at least one non sucrose-based isocyanate-reactive compound, and from 1 wt. % to 13 wt. %, based on the weight of the foam, of at least one aromatic polyester polyol, in the presence of water, and optionally, at least one of carbon dioxide, surfactants, flame retardants, pigments, catalysts and fillers, with the proviso that the rigid polyurethane foam contains no trimethylolpropane-based polyols.

The rigid polyurethane foams according to the invention are prepared by reacting a polyol component with at least one organic polyisocyanate. Suitable polyisocyanates are known to those skilled in the art and include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in *Justus Liebigs Annalen der Chemie,* 562, pages 75 to 136. Examples of such isocyanates include those represented by the formula

in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate; e.g., German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI), which are described, for example, in GB 878,430 and GB 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in GB 994,890, BE 761,616, and NL 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in GB 889,050; polyisocyanates obtained by telomerization reactions of the type described, for example, in U.S. Pat. No. 3,654,106; polyisocyanates containing ester groups of the type described, for example, in GB 965,474 and GB 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat.

No. 3,455,883. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

In general, it is preferred to use readily available polyisocyanates, such as 2,4- and 2,6-toluene diisocyanates and mixtures of these isomers (TDI); polyphenyl-polymethylene-polyisocyanates of the type obtained by condensing aniline with formaldehyde, followed by phosgenation (crude MDI); and polyisocyanates containing carbodiimide groups, urethane groups, allophanate groups, isocyanurate groups, urea groups, or biuret groups (modified polyisocyanates).

Isocyanate-terminated prepolymers may also be employed in the preparation of the foams of the present invention. Prepolymers may be prepared by reacting an excess of organic polyisocyanate or mixtures thereof with a minor amount of an active hydrogen-containing compound as determined by the well-known Zerewitinoff test, as described by Kohler in *Journal of the American Chemical Society,* 49, 3181(1927). These compounds and their methods of preparation are well known to those skilled in the art. The use of any one specific active hydrogen compound is not critical; any such compound can be employed in the practice of the present invention.

The polyol component of the present invention contains at least one sucrose-based polyol, at least one non sucrose-based isocyanate-reactive compound and at least one aromatic polyester polyol, but is free from trimethylolpropane-based polyols.

The sucrose-based polyol employed in the foam of the present invention may be a polyether polyol preferably prepared by reacting sucrose and optionally other initiators (with or without water) with both ethylene oxide and/or propylene oxide in the presence of an alkaline catalyst. The product may be treated with an acid, preferably a hydroxy-carboxylic acid to neutralize the alkaline catalyst. U.S. Pat. No. 4,430,490, which discloses one process for making suitable sucrose-based polyols, is incorporated in its entirety herein by reference thereto. Sucrose polyethers of the type described, for example, in German Auslegeschriften 1,176,358 and 1,064,938 may also be used according to the invention.

The sucrose-based polyether polyol is preferably included in the polyol component in an amount of from 2 to 35% by weight, based on the polyol component, more preferably from 4 to 20% by weight.

The polyol component also includes at least one non sucrose-based isocyanate-reactive compound having a molecular weight of 400 to 10,000 Da. This non sucrose-based compound cannot be based on trimethylolpropane, but may be based on any other isocyanate-reactive compound such as those containing amino groups, hydroxyl groups, thiol groups, or a combination thereof. Suitable compounds include polyethers, polyesters, polyacetals, polycarbonates, polyesterethers, polyester carbonates, polythioethers, polyamides, polyesteramides, polysiloxanes, polybutadienes, and polyacetones. Particularly preferred compounds contain 2 to 4 reactive amino or hydroxyl groups.

Hydroxyl-containing polyethers are preferred as the non sucrose-based isocyanate-reactive compound. Suitable hydroxyl-containing polyethers can be prepared, for example, by the polymerization of epoxides such as ethylene oxide, propylene oxide, butylene oxide, tetrahydrofuran, styrene oxide, or epichlorohydrin, optionally in the presence of $BF_3$, or by chemical addition of such epoxides, optionally as mixtures or successively, to starting components containing reactive hydrogen atoms, such as water, alcohols, or amines. Examples of such starting components include ethylene glycol, 1,2- or 1,3-propanediol, 1,2-, 1,3-, or 1,4-butanediol, glycerin, pentaerythritol, 4,4'-dihydroxydiphenylpropane, aniline, 2,4- or 2,6-diaminotoluene, ammonia, ethanolamine, triethanolamine, or ethylene diamine. Polyethers that contain predominantly primary hydroxyl groups (up to about 90% by weight, based on all of the hydroxyl groups in the polyether) are also suitable. Particularly preferred polyethers include polyoxyalkylene polyether polyols, such as polyoxyethylene diol, polyoxypropylene diol, polyoxybutylene diol, and polytetramethylene diol.

Hydroxyl-containing polyesters are also suitable for use as the non sucrose-based isocyanate-reactive compound. Suitable hydroxyl-containing polyesters include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endo-methylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 1,4- and 2,3-butanediol, 1,6-hexanediol, 1,8-octanediol, neopentyl glycol, 1,3- and 1,4-bis(hydroxymethyl)cyclohexane, 2-methyl-1,3-propanediol, glycerol, 1,2,6-hexanetriol, 1,2,4-butanetriol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, and polybutylene glycols. The polyesters may also contain a proportion of carboxyl end groups. Polyesters of lactones, such as ε-caprolactone, or of hydroxycarboxylic acids, such as ω-hydroxycaproic acid, may also be used. Hydrolytically stable polyesters are preferably used to obtain the greatest benefit relative to the hydrolytic stability of the final product. Preferred polyesters include polyesters obtained from adipic acid or isophthalic acid and straight chained or branched diols, as well as lactone polyesters, preferably those based on caprolactone and diols.

Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates include those prepared by the reaction of diols, such as 1,3-propanediol, 1,4-butanediol, 1,6-hexanediol, diethylene glycol, triethylene glycol, tetraethylene glycol, or thiodiglycol, with phosgene or diaryl carbonates such as diphenyl carbonate (German Auslegeschriften 1,694,080, 1,915,908, and 2,221,751; German Offenlegungsschrift 2,605,024).

Suitable polyester carbonates include those prepared by the reaction of polyester diols, with or without other diols such as 1,3-propanediol, 1,4-butanediol, 1,6-hexanediol, diethylene glycol, triethylene glycol, tetraethylene glycol, or thiodiglycol, with phosgene, cyclic carbonates, or diaryl carbonates such as diphenyl carbonate. Suitable polyester carbonates more generally include compounds such as those disclosed in U.S. Pat. No. 4,430,484.

Suitable polythioethers include the condensation products obtained by the reaction of thiodiglycol, either alone or with other glycols, formaldehyde, or amino alcohols. The products obtained are polythio-mixed ethers, polythioether esters, or polythioether ester amides, depending on the components used.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines, and mixtures thereof.

Although less preferred, other suitable hydroxyl-containing compounds include polyhydroxyl compounds already containing urethane or urea groups and modified or unmodified natural polyols. Products of addition of alkylene oxides to phenol-formaldehyde resins or to urea-formaldehyde resins are also suitable. Furthermore, amide groups may be introduced into the polyhydroxyl compounds as described, for example, in German Offenlegungsschrift 2,559,372.

General discussions of representative hydroxyl-containing compounds that may be used according to the present invention can be found, for example, in *Polyurethanes, Chemistry and Technology* by Saunders and Frisch, Interscience Publishers, New York, London, Volume I, 1962, pages 32-42 and pages 44-54, and Volume II, 1964, pages 5-6 and 198-199, and in *Kunststoff-Handbuch*, Volume VII, Vieweg-Hochtlen, Carl-HanserVerlag, Munich, 1966, on pages 45 to 71.

Suitable compounds containing amino groups include the so-called amine-terminated polyethers containing primary or secondary (preferably primary) aromatically or aliphatically (preferably aliphatically) bound amino groups. Compounds containing amino end groups can also be attached to the polyether chain through urethane or ester groups. These amine-terminated polyethers can be prepared by any of several methods known in the art. For example, amine-terminated polyethers can be prepared from polyhydroxyl polyethers (e.g., polypropylene glycol ethers) by a reaction with ammonia in the presence of Raney nickel and hydrogen (BE 634,741). Polyoxyalkylene polyamines can be prepared by a reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patentschrift 1,193,671. Other methods for the preparation of polyoxyalkylene (polyether) amines are described in U.S. Pat. Nos. 3,155,728 and 3,236,895 and in FR 1,551,605. FR 1,466,708 discloses the preparation of polyethers containing secondary amino end groups. Also useful are the polyether polyamines described in U.S. Pat. Nos. 4,396,729, 4,433,067, 4,444,910, and 4,530,941.

Relatively high molecular weight polyhydroxy-polyethers suitable in the present invention may be converted into the corresponding anthranilic acid esters by reaction with isatoic acid anhydride. Methods for making polyethers containing aromatic amino end groups are disclosed in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or ketimines and hydrolyzing the reaction product.

Aminopolyethers obtained by the hydrolysis of compounds containing isocyanate end groups are also preferred amine-terminated polyethers. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine-terminated polyethers are prepared by hydrolyzing an isocyanate compound having an isocyanate group content of from 0.5 to 40% by weight. The most preferred polyethers are prepared by first reacting a polyether containing two to four hydroxyl groups with an excess of an aromatic polyisocyanate to form an isocyanate-terminated prepolymer and then converting the isocyanate groups to amino groups by hydrolysis. Processes for the production of useful amine-terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645, EP 0,097,299, and German Offenlegungsschrift 2,948,419. Similar products are also described in U.S. Pat. Nos. 4,506,039, 4,525,590, 4,532,266, 4,532,317, 4,723,032, 4,724,252, 4,855,504, and 4,931,595.

Other suitable amine-terminated polyethers include aminophenoxy-substituted polyethers described, for example, in U.S. Pat. Nos. 5,091,582 and 4,847,416.

The amine-terminated polyethers used in the present invention are in many cases mixtures with other isocyanate-reactive compounds having the appropriate molecular weight. These mixtures generally should contain (on a statistical average) two to four isocyanate-reactive amino end groups.

Aminocrotonate-terminated derivatives of polyethers, as well as of other polyols described above, can be prepared from acetoacetate-modified polyethers as described, for example, in U.S. Pat. Nos. 5,066,824, and 5,151,470.

The non sucrose-based isocyanate-reactive compound is included in the polyol component in an amount of from 2 to 35% by weight, based on the polyol component, more preferably from 4 to 20% by weight.

At least one aromatic polyester polyol is included in the polyol component to provide enhanced flame retardant properties of the inventive foam. The preferred aromatic polyester polyols have a nominal functionality of 2 to 3 and a hydroxyl number of from 100-350, more preferably from 150-300. These aromatic polyester polyols are a reaction product of a polyhydric alcohol, preferably a dihydric alcohol and/or a trihydric alcohol with a polybasic, preferably dibasic polycarboxylic acid having an aromatic ring.

To form a polyester polyol, a corresponding polycarboxylic anhydride or a corresponding carboxylate ester of a lower alcohol or a mixture thereof can be used in place of a free polycarboxylic acid. The polycarboxylic acid may be an aromatic polycarboxylic acid and/or a heterocyclic polycarboxylic acid, and it may be a polycarboxylic acid substituted with a halogen atom.

Examples of the polycarboxylic acid include phthalic acid, isophthalic acid, terephthalic acid, trimellitic acid, pyromellitic acid, anhydrous phthalic acid and derivatives thereof. The polyhydric alcohol is preferably an alcohol having three to nine carbon atoms, and may be anyone of a straight-chain, branched or cyclic alcohol. The polyhydric alcohol is preferably a dihydric alcohol and/or a trihydric alcohol. Examples of the dihydric alcohol include ethylene glycol, propylene glycol, butanediol, pentanediol, hexanediol, cyclohexanediol and the like. Those prepared by decomposing polyethylene terephthalate with various glycols may also be used. Aromatic polyester polyols may be obtained from a variety of producers such as KoSa GmbH & Co. KG, Oxid L.P. and Stepan Co.

The aromatic polyester polyol is included in an amount of from 1 to 13% by weight, based on the weight of the foam, more preferably from 5 to 13% by weight.

The isocyanate and polyol component are preferably reacted in the presence of water and/or carbon dioxide. More preferably, water alone is used as the blowing agent which, by reaction with isocyanate groups, delivers carbon dioxide as fuel gas. In addition to water, carbon dioxide, particularly in liquid form, may be added. The blowing agent is preferably included in the polyol component in an amount of from 0.12 to 3% by weight, based on total weight of polyol component, more preferably from 0.5 to 1.5% by weight.

The isocyanate and polyol component are reacted optionally in the presence of at least one of surfactants, flame retardants, pigments, catalysts and fillers.

It may be advantageous to employ a minor amount of a surfactant to stabilize the foaming reaction mixture until it obtains rigidity. Any suitable surfactant can be employed in the invention, including silicone/ethylene oxide/propylene oxide copolymers. Examples of surfactants useful in the present invention include those commercially available from manufacturers including Witco Corp., Air Products and Goldschmidt AG. Other suitable surfactants are described in U.S. Pat. Nos. 4,365,024 and 4,529,745. Other, less preferred surfactants include polyethylene glycol ethers of long chain alcohols, tertiary amine or alkanolamine salts of long chain alkyl acid sulfate esters, alkylsulfonic esters, alkylarylsulfonic acids. Such surfactants are employed in amounts sufficient to stabilize the foaming reaction mixture against collapse and the formation of large, and uneven cells. The surfactant may be included in the polyol component in an amount of from 0.05 to 10, and preferably from 0.1 to 6, weight percent of the polyol component.

Suitable flame retardants (as used herein also refers to smoke suppressants and other known combustion modifiers), include phosphonates, phosphites, and phosphates (such as dimethyl methylphosphonate, ammonium polyphosphate, and various cyclic phosphate and phosphonate esters, as well as, reactive oligomeric organophosphates having functionality greater than 1, known to those skilled in the art); halogen-containing compounds known in the art (such as brominated diphenyl ether and other brominated aromatic and aliphatic compounds); melamine; antimony oxides (such as antimony pentoxide and antimony trioxide); zinc compounds (such as various known zinc borates); aluminum compounds (such as alumina trihydrate); magnesium compounds (such as magnesium hydroxide); and urea. The flame retardant may be included in an amount of from 5 to 75 wt. % of the polyol component, more preferably from 10 to 65 wt. % and most preferably from 10 to 55 wt. %.

Suitable catalysts include tertiary amines and metal compounds known to those skilled in the art. Suitable tertiary amine catalysts include triethylamine, tributylamine, triethylene diamine, N-methylmorpholine, N-ethylmorpholine, N,N,N',N'-tetramethylethylene diamine, pentamethyldiethylene triamine, and higher homologs, 1,4-diazabicyclo[2.2.2]octane, N-methyl-N'-(dimethylaminoethyl)-piperazine, bis(dimethylaminoalkyl)piperazines, N,N-dimethylbenzylamine, N,N-dimethylcyclohexylamine, N,N-diethylbenzylamine, bis(N,N-diethylaminoethyl)adipate, N,N,N',N'-tetramethyl-1,3-butanediamine, N,N-dimethyl-β-phenylethylamine, amine salt of diazabicycloundecene and formic acid, 1,2-dimethylimidazole, 2-methylimidazole, monocyclic and bicyclic amidines, bis(dialkylamino)alkyl ethers (U.S. Pat. No. 3,330,782), and tertiary amines containing amide groups (preferably formamide groups). The catalysts used may also be the known Mannich bases of secondary amines (such as dimethylamine) and aldehydes (preferably formaldehyde) or ketones (such as acetone) and phenols.

Suitable catalysts also include certain tertiary amines containing isocyanate-reactive hydrogen atoms. Examples of such catalysts include triethanolamine, triisopropanolamine, N-methyldiethanolamine, N-ethyldiethanolamine, N,N-dimethylethanolamine, their reaction products with alkylene oxides (such as propylene oxide and/or ethylene oxide) and secondary-tertiary amines.

Other suitable catalysts include organic metal compounds, especially organic tin, bismuth, and zinc compounds. Suitable organic tin compounds include those containing sulfur, such as dioctyl tin mercaptide and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth compounds include bismuth neodecanoate, bismuth versalate, and various bismuth carboxylates known in the art. Suitable zinc compounds include zinc neodecanoate and zinc versalate. Mixed metal salts containing more than one metal (such as carboxylic acid salts containing both zinc and bismuth) are also suitable catalysts. Any of the above-mentioned catalysts may, of course, be used as mixtures. Suitable catalyst mixtures may be found in U.S. Pat. No. 5,401,824.

The catalyst(s) may be included in the polyol component in an amount preferably such that the catalyst(s) chosen produce the desired reactivity profile based on the chosen volume of blowing agent used.

Fillers and reinforcing agents are also suitable for use in the presently claimed invention. Suitable fillers and reinforcing agents include both organic and inorganic compounds. These inorganic compounds include, for example, compounds such as glass in the form of fibers, flakes, cut fibers, mats, or microspheres; mica, wollastonite; carbon fibers; carbon black; talc; and calcium carbonate. Suitable organic compounds include, for example, expanded microspheres which are known and described in, for example, U.S. Pat. Nos. 4,829,094, 4,843,104, 4,902,722 and 5,244,613. These include commercially available microspheres such as, for example, DUALITE M6017AE, DUALITE M6001AE and DUALITE M6029AE, all of which are available from Pierce and Stevens Corporation, and EXPANDOCEL which is available from Nobel Industries. Also suitable are substances such as barium sulfate, calcium silicate, clays, kieselguhr, whiting, mica, liquid crystal fibers and aramide fibers. The filler may be included in the polyol component in any amounts up to 30 wt. %, more preferably from 0 wt. % to 20 wt. %, based on the weight of the foam.

Regardless of the particular type of polyurethane product that is to be prepared, the polyurethane-forming components (i.e., the polyol component and the polyisocyanate) may be allowed to react, for example, by one-stage reactions, prepolymer reactions, or semiprepolymer reactions. Suitable techniques include reaction injection molding ("RIM"), resin transfer molding ("RTM"), cast molding, open pour molding, and spraying. Machines, such as those described in U.S. Pat. No. 2,764,565, may be used in many of these processes. Particulars of the processing machines which may also be used to produce polyurethanes according to the invention may be found in *Kunststoff-Handbuch*, Vol. VII, Vieweg and Hochtlen, Carl-Hanser-Verlag, Munich 1966, pages 121 to 205.

When carrying out the reaction of the polyol component with the polyisocyanate, the quantity of the polyisocyanate should preferably be such that the isocyanate index is from 100 to 400, more preferably from 105-200. By "isocyanate index" is meant the quotient of the number of isocyanate groups divided by the number of isocyanate-reactive groups, multiplied by 100. The foam-forming formulation of the present invention is preferably a liquid at room temperature.

Examples

The present invention is further illustrated, but is not to be limited, by the following examples. All quantities given in "parts" and "percents" are understood to be by weight, unless otherwise indicated. The following materials were used in preparing the foams of the examples:

| | |
|---|---|
| ISOCYANATE A | an MDI prepolymer having an NCO of 28.9%, available as MONDUR MRP from Bayer MaterialScience; |
| POLYOL A | a sucrose-based polyether polyol having a hydroxyl number of 370-390; |
| POLYOL B | a sucrose-propylene glycol based polypropylene oxide polyether polyol having a hydroxyl number of 365-395; |
| POLYOL C | a glycerin polypropylene oxide capped triol having a weight average molecular weight of 675; |
| POLYOL D | a glycerin polypropylene oxide capped triol having a weight average molecular weight of 160; |
| POLYOL E | an aromatic polyester polyol having a hydroxyl number of 175-195, available as TEROL 198 from Oxid; |
| POLYOL F | a modified aromatic polyester polyol based on polyethylene terephthalate ("PET") having a hydroxyl number of 300-320, available as TEROL 611 EXP from Oxid; |
| POLYOL G | an aromatic polyester polyol made from recycled polyethylene terephthalate (PET) having a hydroxyl number of 110 available as TEROL DS-280 from Oxid; |
| POLYOL H | an aromatic polyester polyol made from recycled polyethylene terephthalate (PET) having a hydroxyl number of 230 available as TEROL DS-588 from Oxid; |
| POLYOL I | a propylene glycol polypropylene oxide capped diol having a weight average molecular weight of 425 and a functionality of 2; |
| COMPATIBILIZER | the reaction product of N,N-dimethylpropylene diamine with tall oil; |
| SURFACTANT | a silicone surfactant available as DABCO DC193 from Air Products & Chemicals; |
| CATALYST A | triethylene diamine in dipropylene glycol (33/67); |
| CATALYST B | an amine catalyst of salt (<70%) diazabicycloundecene and formic acid and (<30%) ethylene glycol; |
| CATALYST C | N,N-dimethylcyclohexylamine; |
| FLAME RETARDANT A | a neutral cyclic phosphonate ester containing 21% phosphorus available as ANTIBLAZE NR-25 from Albright and Wilson Americas, Inc.; |
| FLAME RETARDANT B | a finely divided, low-water-solubility ammonium polyphosphate; |
| FLAME RETARDANT C | alumina trihydrate; and |
| FLAME RETARDANT D | 3,4,5,6-tetrabromo-1,2-benzene dicarboxylic acid mixed esters with diethylene glycol and propylene glycol having a hydroxyl number of 217 and functionality of 2. |

Foams were made from the parts by weight of the components listed below in Table I. The polyols and other components were first combined and then reacted with the isocyanate according to the processing conditions given in Table I. The reactivity of the foams is also given in Table I. C-1 denotes a comparative example.

TABLE I

| Component | C-1 | Ex. 2 | Ex. 3 | Ex. 4 | Ex. 5 | Ex. 6 |
|---|---|---|---|---|---|---|
| POLYOL A | 41 | 41 | 41 | 41 | 41 | 41 |
| POLYOL B | 8.9 | 8.9 | 8.9 | 8.9 | 8.9 | 8.9 |
| POLYOL C | 25.4 | 25.4 | 25.4 | 25.4 | 25.4 | 25.4 |
| POLYOL D | 20 | 20 | 20 | 20 | 20 | 20 |
| FLAME RETARDANT A | 5 | 5 | 5 | 5 | 5 | 5 |
| FLAME RETARDANT B | 47 | 47 | 47 | 47 | 47 | 47 |
| FLAME RETARDANT C | 103.4 | 103.4 | 103.4 | 103.4 | 103.4 | 103.4 |
| FLAME RETARDANT D | 33 | — | — | — | — | — |
| POLYOL E | — | 33 | 48 | — | — | — |
| POLYOL F | — | — | — | 33 | — | — |
| POLYOL G | — | — | — | — | 33 | — |
| POLYOL H | — | — | — | — | — | 33 |
| POLYOL I | 15 | 15 | — | 15 | 15 | 15 |
| COMPATIBILIZER | 2.8 | 2.8 | 2.8 | 2.8 | 2.8 | 2.8 |
| WATER | 1.5 | 1.5 | 1.5 | 1.5 | 1.5 | 1.5 |
| SURFACTANT | 0.95 | 0.95 | 0.95 | 0.95 | 0.95 | 0.95 |
| CATALYST A | 0.6 | 0.6 | 0.6 | 0.6 | 0.6 | 0.6 |
| CATALYST B | 0.5 | 0.5 | 0.5 | 0.5 | 0.5 | 0.5 |
| CATALYST C | 0.35 | 0.35 | 0.35 | 0.35 | 0.35 | 0.35 |
| ISOCYANATE A | 100 | 100 | 100 | 100 | 100 | 100 |
| Processing Conditions | | | | | | |
| Ratio A/100B | 70.83 | 69.73 | 68.49 | 74.03 | 67.14 | 71.1 |
| Index | 123 | 123 | 123 | 123 | 123 | 123 |
| Reactivity (Hand mix at room temperature) | | | | | | |
| Cream Time (seconds) | 39 | 36 | 42 | 50 | 45 | NA |
| Gel Time (seconds) | 140 | 120 | 134 | 142 | 150 | NA |
| Tack Time (seconds) | 225 | 208 | 259 | 255 | 282 | NA |
| Free Rise Density (lb/ft$^3$) | 9.19 | 8.98 | 8.97 | 10.2 | 9.42 | NA |

Mini Tunnel Test:

Surface burning characteristics of the foams made in the examples were determined according to a modification of the ASTM E-84 "Standard Test Method for Surface Burning Characteristics of Building Materials." Popularly known as the "Tunnel Test", ASTM E-84 requires a 24 ft. by 20 in. foam specimen be exposed to a controlled air flow and flaming fire exposure which is adjusted so as to spread a flame along the entire length of a select grade oak specimen in 5.5 minutes.

The mini tunnel test used to generate the data in Table II measured the spread of flame on the surface of a foam as well, but instead used a four-foot by seven inch specimen in a four-foot "mini" tunnel. The foam specimen was exposed to a controlled air flow and flaming fire exposure adjusted so its spread of flame along the entire length of its surface burned under conditions comparable to a known Class I rated material which was used as a control and was burned each time this unit was used to ensure consistency. This control material was tested at Underwriters Laboratories, Inc. by E-84 Tunnel Test and was rated a Class I material as well.

After the sample being examined had been burned, a comparison was made between actual data produced from this Class I rated material and the experimental foam burned in the four-foot mini tunnel. The $FSC_{48}$ (Flame Spread Calculated) and smoke values were calculated. This test was performed on a core foam of chosen thickness or on the face of the samples. The flame spread takes into account both the rate and total distance of the propagation of a flame front and was measured visually.

The smoke factor is a time-integrated measurement of the occlusion of a visible beam of light. The foam's performance in the mini tunnel test was judged by similar categories as used in the E-84 test, i.e., a flame spread index of 0-25 was considered to be Class I; 26-75 was Class II; and 76-225 was Class III. As in the E-84 test, a smoke limit of less than 450 was required for each of these classes. The mini tunnel test results are summarized below in Table II. As can be appreciated by reference to Table II below, all of the inventive foams achieved a Class I rating in the mini tunnel test.

TABLE II

| Mini Tunnel Test | C-1 | Ex. 2 | Ex. 3 | Ex. 4 | Ex. 5 | Ex. 6 |
|---|---|---|---|---|---|---|
| $FSC_{48}$ | 28 | 24 | 22 | 25 | 25 | 23 |
| Smoke | 580 | 432 | 405 | 437 | 413 | 449 |
| Max (in) | 40 | 34 | 34 | 36 | 36 | 38 |
| Time (seconds) | 50 | 7 | 6 | 8 | 7 | 160 |

Cone Calorimeter Testing

In recent years, it has become increasingly accepted by those in the art that the best fire tests are those which have some correlation to real fires. It is now widely thought by those skilled in the art that the single most important descriptor of the size of a fire is the rate of heat release. Heretofore heat release was very difficult to measure, although more recently, full-scale testing has been possible by burning articles and measuring the evolved heat using a technique called oxygen depletion calorimetry. On a small scale, the rate of heat release is usually measured with a cone calorimeter. The cone calorimeter test is standardized in ASTM E-1354, 1999.

A cone calorimeter was used to measure heat release rate and effective heat of combustion by the oxygen consumption principle. The calorimeter also was used to measure specific extinction area, carbon monoxide and carbon dioxide production during the burning of the foam samples exposed to radiant heat fluxes from a conical heater set at 75 kW/m². Cone calorimeter testing of the foams of the examples is summarized below in Table III.

TABLE III

| Cone Calorimeter | C-1 | Ex. 2 | Ex. 3 | Ex. 4 | Ex. 5 | Ex. 6 |
|---|---|---|---|---|---|---|
| Effective Heat of Combustion at Peak (MJ/kg) | 30.05 | 35 | 29.75 | 17.4 | 41.75 | 25.75 |
| Heat Release Rate at Peak (kW/m²) | 200 | 256.2 | 165.6 | 115.7 | 160.8 | 196.7 |
| Specific Extinction Area at Peak (m²/kg) | 1,510 | 711.6 | 626.8 | 372 | 785.4 | 696.4 |

As can be appreciated by reference to Table III, the Specific Extinction Area at Peak is one-half or more compared to the control (C-1) with respect to the volume of smoke produced for Examples 2 through 6 without substantially changing the flaming properties or Heat Release Rate of the foam.

The inventors herein envision that the inventive foams can be used in any application requiring some integral skin formation and strength, and ranging in molded density from 15 to 61.5 pounds/cubic foot. For example, the inventive foams can be used for electronic cabinetry, architectural decorative moldings of all types, interior transportation vehicle walls and accessories requiring E-84 Class I type burn properties.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A rigid flame retardant polyurethane foam which satisfies the requirements of ASTM E-84 for a Class I foam comprising the reaction product of:
    at least one polyisocyanate; with
    a polyol component comprising,
        from about 2 wt. % to about 35 wt. %, based on the weight of the polyol component, of at least one sucrose-based polyol,
        from about 2 wt. % to about 35 wt. %, based on the weight of the polyol component, of at least one non sucrose-based isocyanate-reactive compound, and
        from about 1 wt. % to about 13 wt. %, based on the weight of the foam, of at least one aromatic polyester polyol,
    in the presence of water, and optionally, at least one of carbon dioxide, surfactants, flame retardants, pigments, catalysts and fillers,
    with the proviso that the rigid polyurethane foam contains no trimethylolpropane-based polyols.

2. The rigid polyurethane foam according to claim 1, wherein the at least one polyisocyanate is chosen from ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-and-1,4-diisocyanate, 1-isocyanato-3,3,5-trimethyl-5-isocyanatomethyl-cyclohexane (isophorone diisocyanate), 2,4- and 2,6-hexahydrotoluene diisocyanate, dicyclohexylmethane-4,4'-diisocyanate (hydrogenated MDI, or HMDI), 1,3- and 1,4-phenylene diisocyanate, 2,4- and 2,6-toluene diisocyanate (TDI), diphenylmethane-2,4'- and/or -4,4'-diisocyanate (MDI), naphthylene-1,5-diisocyanate, triphenyl-methane-4,4',4"-diisocyanate, polyphenyl-polymethylene-polyisocyanates (crude MDI), norbornane diisocyanates, m- and p-isocyanatophenyl sulfonylisocyanates, perchlorinated aryl polyisocyanates, carbodiimide-modified polyisocyanates, urethane-modified polyisocyanates, allophanate-modified polyisocyanates, isocyanurate-modified polyisocyanates, urea-modified polyisocyanates, biuret containing polyisocyanates and isocyanate-terminated prepolymers.

3. The rigid polyurethane foam according to claim 1, wherein the at least one polyisocyanate is an isocyanate-terminated prepolymer.

4. The rigid polyurethane foam according to claim 1, wherein the isocyanate index is from about 100 to about 400.

5. The rigid polyurethane foam according to claim 1, wherein the isocyanate index is from about 105 to about 200.

6. The rigid polyurethane foam according to claim 1, wherein the at least one sucrose-based polyol comprises from about 4 wt. % to about 20 wt. %, based on the weight of the polyol component.

7. The rigid polyurethane foam according to claim 1, wherein the at least one non sucrose-based isocyanate-reactive compound is chosen from polyethers, polyesters, polyacetals, polycarbonates, polyesterethers, polyester carbonates, polythioethers, polyamides, polyesteramides, polysiloxanes, polybutadienes and polyacetones.

8. The rigid polyurethane foam according to claim 1, wherein the at least one non sucrose-based isocyanate-reactive compound is a polyether polyol.

9. The rigid polyurethane foam according to claim 1, wherein the at least one non sucrose-based isocyanate-reactive compound comprises from about 4 wt. % to about 20 wt. %, based on the weight of the polyol component.

10. The rigid polyurethane foam according to claim 1, wherein the at least one aromatic polyester polyol comprises from about 5 wt. % to about 13 wt. %, based on the weight of the foam.

11. The rigid polyurethane foam according to claim 1, wherein the catalyst comprises one or more chosen from triethylamine, tributylamine, triethylene diamine, N-methylmorpholine, N-ethylmorpholine, N,N,N',N'-tetramethylethylene diamine, pentamethyldiethylene triamine, 1,4-diazabicyclo[2.2.2]octane, N-methyl-N'-(dimethylaminoethyl) piperazine, bis(dimethylaminoalkyl)piperazines, N,N-dimethylbenzylamine, N,N-dimethylcyclohexylamine, N,N-diethylbenzylamine, bis(N,N-diethylaminoethyl)adipate, N,N,N',N'-tetramethyl-1,3-butanediamine, N,N-dimethyl-β-phenylethylamine, amine salt of diazabicycloundecene and formic acid, 1,2-dimethylimidazole, 2-methylimidazole, monocyclic and bicyclic amidines, bis(dialkylamino)alkyl ethers, triethanolamine, triisopropanolamine, N-methyldiethanolamine, N-ethyldiethanolamine, N,N-dimethylethanolamine, dioctyl tin mercaptide, tin(II) acetate, tin(II) octoate, tin(II) ethylhexoate, tin(II) laurate, dibutyltin dilaurate, dibutyltin dichloride, dibutyltin diacetate, dibutyltin maleate, and dioctyltin diacetate, bismuth neodecanoate, bismuth versalate, bismuth carboxylates, zinc neodecanoate, zinc versalate and carboxylic acid salts containing zinc and bismuth.

12. The rigid polyurethane foam according to claim 1, wherein the flame retardant is chosen from phosphonates, phosphites, phosphates, halogen-containing compounds, melamine, antimony oxides, zinc compounds, aluminum compounds, magnesium compounds and mixtures thereof.

13. The rigid polyurethane foam according to claim 1, wherein the flame retardant is chosen from dimethyl methylphosphonate, diethyl ethyl phosphonate, triethylphosphonate, ammonium polyphosphate, brominated diphenyl ethers and other brominated aromatic and aliphatic compounds, melamine, antimony pentoxide, antimony trioxide, zinc borates, alumina trihydrate, magnesium hydroxide, neutralcyclic phosphate and phosphonate esters, and mixtures thereof.

14. The rigid polyurethane foam according to claim 1, wherein the flame retardant comprises from about 5 wt. % to about 75 wt. %, based on the weight of the polyol component.

15. The rigid polyurethane foam according to claim 1, wherein the flame retardant comprises from about 10 wt. % to about 65 wt. %, based on the weight of the polyol component.

16. The rigid polyurethane foam according to claim 1, wherein the flame retardant comprises from about 10 wt. % to about 55 wt. %, based on the weight of the polyol component.

17. The rigid polyurethane foam according to claim 1, wherein the filler is chosen from glass fibers, glass flakes, cut fibers, mats, microspheres, mica, wollastonite, carbon fibers, carbon black, talc, calcium carbonate, barium sulfate, calcium silicate, clays, kieselguhr, whiting, mica, liquid crystal fibers and aramide fibers.

18. One of an electronic cabinet, an architectural decorative molding, and an interior transportation vehicle wall comprising the rigid polyurethane foam according to claim 1.

19. A process for making a rigid flame retardant polyurethane foam which satisfies the requirements of ASTM E-84 for a Class I foam comprising reacting:
at least one polyisocyanate; with
a polyol component comprising,
from about 2 wt % to about 35 wt. %, based on the weight of the polyol component, of at least one sucrose-based polyol,
from about 2 wt. % to about 35 wt. %, based on the weight of the polyol component, of at least one non sucrose-based isocyanate-reactive compound, and
from about 1 wt. % to about 13 wt. %, based on the weight of the foam, of at least one aromatic polyester polyol,
in the presence of water, and optionally, at least one of carbon dioxide, surfactants, flame retardants, pigments, catalysts and fillers,
with the proviso that the rigid polyurethane foam contains no trimethylolpropane-based polyols.

20. The process according to claim 19, wherein the at least one polyisocyanate is chosen from ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-and-1,4-diisocyanate, 1-isocyanato-3,3,5-trimethyl-5-isocyanatomethyl-cyclohexane (isophorone diisocyanate), 2,4- and 2,6-hexahydrotoluene diisocyanate, dicyclohexylmethane-4,4'-diisocyanate (hydrogenated MDI, or HMDI), 1,3- and 1,4-phenylene diisocyanate, 2,4- and 2,6-toluene diisocyanate (TDI), diphenylmethane-2,4'- and/or -4,4'-diisocyanate (MDI), naphthylene-1,5-diisocyanate, triphenyl-methane-4,4',4''-triisocyanate, polyphenyl-polymethylene-polyisocyanates (crude MDI), norbornane diisocyanates, m- and p-isocyanatophenyl sulfonylisocyanates, perchlorinated aryl polyisocyanates, carbodiimide-modified polyisocyanates, urethane-modified polyisocyanates, allophanate-modified polyisocyanates, isocyanurate-modified polyisocyanates, urea-modified polyisocyanates, biuret containing polyisocyanates and isocyanate-terminated prepolymers.

21. The process according to claim 19, wherein the at least one polyisocyanate is an isocyanate-terminated prepolymer.

22. The process according to claim 19, wherein the isocyanate index is from about 100 to about 400.

23. The process according to claim 19, wherein the isocyanate index is from about 105 to about 200.

24. The process according to claim 19, wherein the at least one sucrose-based polyol comprises from about 4 wt. % to about 20 wt. %, based on the weight of the polyol component.

25. The process according to claim 19, wherein the at least one non sucrose-based isocyanate-reactive compound is chosen from polyethers, polyesters, polyacetals, polycarbonates, polyesterethers, polyester carbonates, polythioethers, polyamides, polyesteramides, polysiloxanes, polybutadienes and polyacetones.

26. The process according to claim 19, wherein the at least one non sucrose-based isocyanate-reactive compound is a polyether polyol.

27. The process according to claim 19, wherein the at least one non sucrose-based isocyanate-reactive compound comprises from about 4 wt. % to about 20 wt. %, based on the weight of the polyol component.

28. The process according to claim 19, wherein the at least one aromatic polyester polyol comprises from about 5 wt. % to about 13 wt. %, based on the weight of the foam.

29. The process according to claim 19, wherein the catalyst comprises one or more chosen from triethylamine, tributylamine, triethylene diamine, N-methylmorpholine, N-ethylmorpholine, N,N,N',N'-tetramethylethylene diamine, pentamethyldiethylene triamine, 1,4-diazabicyclo[2.2.2]octane, N-methyl-N'-(dimethylaminoethyl)piperazine, bis(dimethylaminoalkyl)piperazines, N,N-dimethylbenzylamine, N,N-dimethylcyclohexylamine, N,N-diethylbenzylamine, bis(N,N-diethylaminoethyl)adipate, N,N,N',N'-tetramethyl-1,3-butanediamine, N,N-dimethyl-β-phenylethylamine, amine salt of diazabicycloundecene and formic acid, 1,2-dimethylimidazole, 2-methylimidazole, monocyclic and bicyclic amidines, bis(dialkylamino)alkyl ethers, triethanolamine, triisopropanolamine, N-methyldiethanolamine, N-ethyldiethanolamine, N,N-dimethylethanolamine, dioctyl tin mercaptide, tin(II) acetate, tin(II) octoate, tin(II) ethylhexoate, tin(II) laurate, dibutyltin dilaurate, dibutyltin dichloride, dibutyltin diacetate, dibutyltin maleate, and dioctyltin diacetate, bismuth neodecanoate, bismuth versalate, bismuth carboxylates, zinc neodecanoate, zinc versalate and carboxylic acid salts containing zinc and bismuth.

30. The process according to claim 19, wherein the flame retardant is chosen from phosphonates, phosphites, phosphates, halogen-containing compounds, melamine, antimony oxides, zinc compounds, aluminum compounds, magnesium compounds, urea and mixtures thereof.

31. The process according to claim 19, wherein the flame retardant is chosen from dimethyl methylphosphonate, diethyl ethyl phosphonate, triethylphosphonate, ammonium polyphosphate, brominated diphenyl ethers and other brominated aromatic and aliphatic compounds, melamine, antimony pentoxide, antimony trioxide, zinc borates, alumina trihydrate, magnesium hydroxide, neutralcyclic phosphate and phosphonate esters, urea and mixtures thereof.

32. The process according to claim 19, wherein the flame retardant comprises from about 5 wt. % to about 75 wt. %, based on the weight of the polyol component.

33. The process according to claim 19, wherein the flame retardant comprises from about 10 wt % to about 65 wt. %, based on the weight of the polyol component.

34. The process according to claim 19, wherein the flame retardant comprises from about 10 wt. % to about 55 wt. %, based on the weight of the polyol component.

35. The process according to claim 19, wherein the filler is chosen from glass fibers, glass flakes, cut fibers, mats, microspheres, mica, wollastonite, carbon fibers, carbon black, talc, calcium carbonate, barium sulfate, calcium silicate, clays, kieselguhr, whiting, mica, liquid crystal fibers and aramide fibers.

36. The foam made by the process according to claim 19.

37. One of an electronic cabinet, an architectural decorative molding, and an interior transportation vehicle wall comprising the rigid polyurethane foam made by the process according to claim 19.

* * * * *